(No Model.)
J. KASSCHAU.
REFLECTOR FOR GAS BURNERS.
No. 291,199. Patented Jan. 1, 1884.
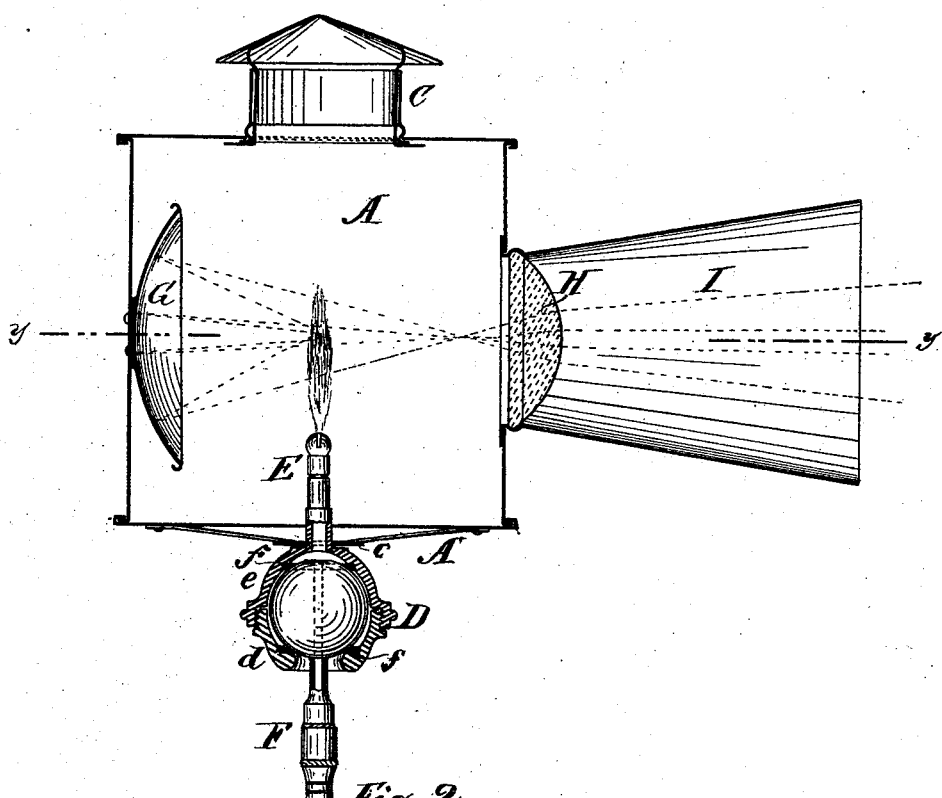
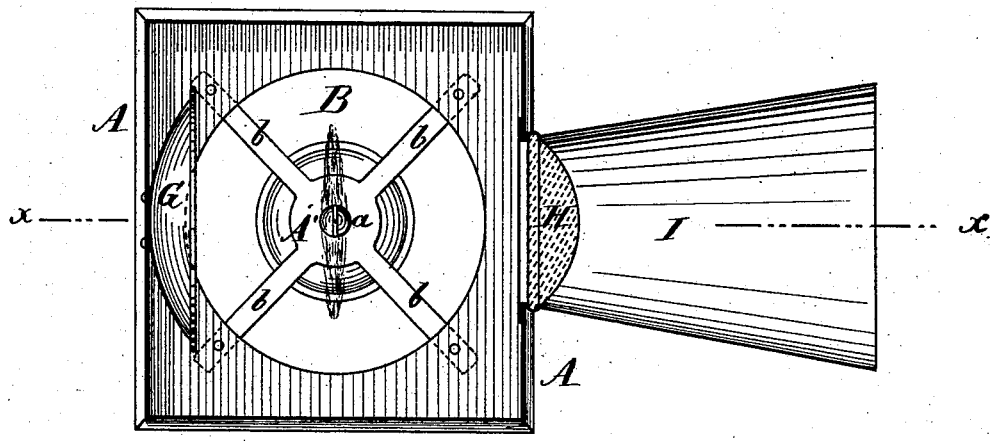
WITNESSES:
H. Raßbach
Otto Risch
INVENTOR
Jürgen Kasschau
BY Paul Goepel.
ATTORNEY

UNITED STATES PATENT OFFICE.

JÜRGEN KASSCHAU, OF NEW YORK, N. Y.

REFLECTOR FOR GAS-BURNERS.

SPECIFICATION forming part of Letters Patent No. 291,199, dated January 1, 1884.

Application filed July 20, 1882. Renewed October 2, 1883. (No model.)

*To all whom it may concern:*

Be it known that I, JÜRGEN KASSCHAU, of the city, county, and State of New York, have invented certain new and useful Improvements in Reflectors for Gas-Burners, of which the following is a specification.

This invention relates to an improved reflector that is intended to be applied to gas-burners, so that the light can be thrown in any desired direction upon a picture or other article, it being mainly intended for parlor use, so as to admit the lighting up of any part thereof.

The invention consists, principally, of a camera connected by a ball-and-socket joint to the gas-burner of a chandelier or bracket, said camera being provided at one side of its interior with a reflector and at the side opposite the reflector with a lens and a conical tube for emitting the light and throwing it to any desired point.

In the accompanying drawings, Figure 1 represents a vertical longitudinal section on line $x\,x$, Fig. 2, and Fig. 2 a horizontal section on line $y\,y$ of my improved reflector for gas-burners.

Similar letters of reference indicate corresponding parts.

Referring to the drawings, A represents a camera of square shape, which is preferably made of sheet metal finished in a suitable manner, and which is provided with a large opening, B, in the bottom part, for the admission of air to support combustion, and with a chimney, C, in the top part, for the escape of the gases of combustion. The camera A is provided with a supporting-frame, which extends across the air-opening in the bottom thereof. This frame consists of a central plate, $a$, having a circular slot adapted to fit over a gas-burner tube, and radial arms $b$, attached to the bottom plate of the camera.

D is a ball-and-socket joint, the upper or socket member of which carries a gas-burner, E, while the lower or ball member has a tubular socket, F, similar to the socket of a drop-light tube. The shell of the spherical socket next the burner-tube is provided with a shoulder, $c$, on which rests the plate $a$ when the camera is supported on the joint. The ball is centrally perforated, so as to form a passage for the gas from the tubular socket F, with which it forms an integral part.

In order to obtain a tight joint, which will prevent the escape of gas, the spherical socket of the ball-and-socket joint is composed of two detachable hemispherical sections, $d\,e$, the lower section, $d$, being screwed into the upper section, $e$. The lower section serves to clamp the socket firmly to the ball, thereby holding the camera in the desired position. Both hemispherical sections are provided with rubber packing-rings $f\,f$, whereby any leakage of the gas is prevented. A reflector, G, is secured at one side of the flame to the interior wall of the camera A, and a lens, H, and a conical light-emitting tube, I, attached to the opposite wall of the camera, which wall has a perforation large enough to receive the lens. The direct and reflected rays of light pass through the lens and tube into the room. By adjusting the camera by means of the ball-and-socket joint to any desired direction and inclination, the light may be thrown to any point in a room or parlor, so as to facilitate certain work, or so as to exhibit pictures or other articles to advantage. The reflector forms thus a very neat and effective device to throw a body of light upon any article without the necessity of turning on all the gas-flames, it being also useful for reading in any part of the room, as the light will be thereby concentrated and at the point where it is desired for use.

Having thus described my invention, I claim as new and desire to secure by Letters Patent—

1. A reflector for gas-burners, consisting of a camera having an interior reflector and a light-directing tube opposite the reflector, and a ball-and-socket joint having a gas-burner connected to one member thereof, and a tubular socket connected to the other member thereof, substantially as set forth.

2. A reflector for gas-burners, consisting of a camera having an interior reflector and a lens opposite the reflector, and a ball-and-socket joint having a gas-burner connected to one member thereof, and a tubular socket connected to the other member thereof, substantially as set forth.

3. A reflector for gas-burners, composed of a camera having an interior reflector, a lens and light-emitting tube, and a ball-and-socket joint having a burner connected to the socket and a supporting-sleeve connected to the ball, substantially as and for the purpose set forth.

4. In a reflector for gas-burners, the combination of the camera with a ball-and-socket joint, the socket part of which carries a gas-burner, while the ball is provided with a sleeve, the socket being applied by a screw-clamping section and interior elastic rings to the ball, substantially as and for the purpose set forth.

In testimony that I claim the foregoing as my invention I have signed my name in presence of two subscribing witnesses.

JÜRGEN KASSCHAU.

Witnesses:
  PAUL GOEPEL,
  SIDNEY MANN.